Aug. 2, 1960  W. G. STOECKICHT  2,947,198
HELICOPTER GEARING
Filed Feb. 27, 1958
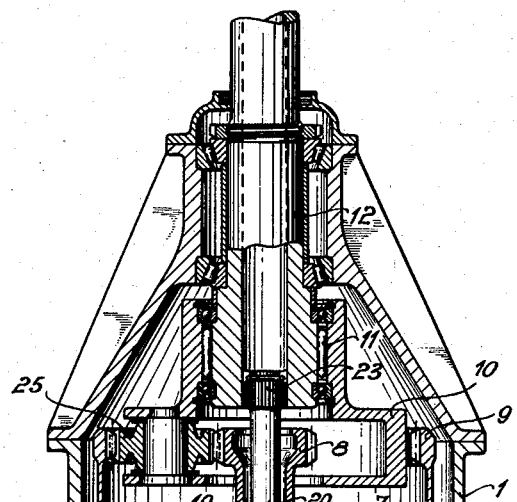
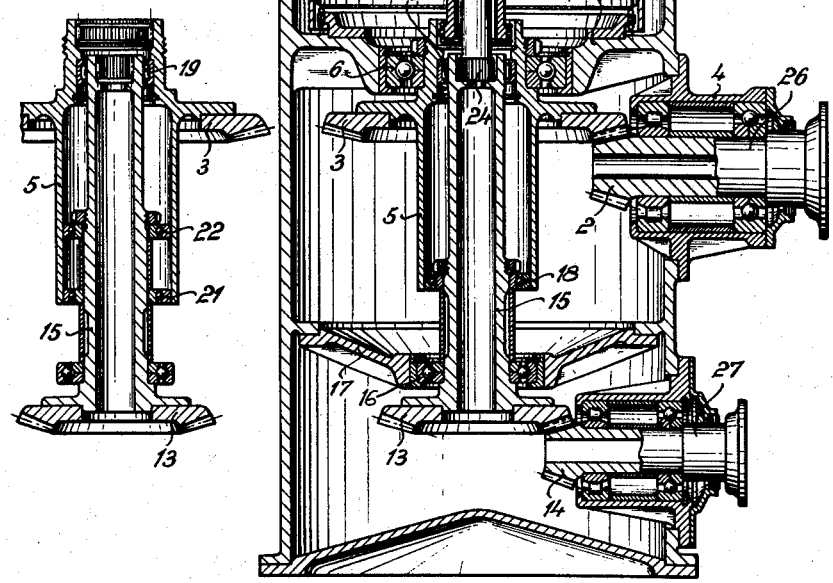
INVENTOR
WILHELM G. STOECKICHT
BY
Harness, Dickey & Pierce
ATTORNEYS United States Patent Office 2,947,198
Patented Aug. 2, 1960

2,947,198

HELICOPTER GEARING

Wilhelm G. Stoeckicht, 4 Rugendasstrasse, Munich-Solln, Germany

Filed Feb. 27, 1958, Ser. No. 718,021

Claims priority, application Germany Mar. 7, 1957

7 Claims. (Cl. 74—665)

The invention relates to a helicopter gearing for driving two propeller shafts of a helicopter from one driving shaft and can relate either to a two-rotor or a one-rotor helicopter. The invention particularly relates to a gearing for a one-rotor helicopter with a subsidiary rotor, in which the drive of each of the two rotor shafts is effected by way of a pair of bevel gears.

In helicopter gearings, the drive of one rotor shaft is generally effected by way of a pair of bevel gears, which are frequently connected to one stage of a set of planet wheels. A further rotor or a subsidiary propeller is driven from the rotor shaft via a further pair of bevel gears. Since, as in all aircraft drives a low weight is of value, specifically highly loaded gear trains are concerned in these bevel gear drives. The mechanism housing should likewise be as light as possible, so that it is difficult if not practically impossible to provide satisfactory meshing conditions for the gear wheels, for the unavoidable yielding of light housings lead to tooth engagement displacements, to which bevel gears are particularly subject as is well known.

The invention has the object of overcoming these disadvantages. This is effected according to the invention in that each of the two bevel gears arranged to be co-axial with the rotor is mounted only once in the housing and each is provided with a shaft extension; these co-axial shafts, of which at least one is a hollow shaft, are mounted in one another, so that in spite of slight weight a very rigid support for the two bevel gears is given.

The drawings show two embodiments of the invention. In Fig. 1, a helicopter gearing according to the invention is illustrated, in the housing 1 of which, by means of a suitable bearing bushing 4, a driving shaft 26 with a driving gear wheel pinion 2 is mounted, which is driven from any driving mechanism. This pinion 2 drives a bevel gear 3 which is disposed on a hollow shaft 5, supported by means of a bearing 6 in the housing wall 7 which takes up both transverse and longitudinal forces. The sun-wheel of a planet gear is driven from the shaft 5, whose outer central wheel 9 is connected with the housing 1 to take up its rotary movement of reaction, whereas the planet carrier 10 is connected in known manner via a free wheel coupling 11 with the rotor shaft 12. The planet wheels freely rotatably mounted upon the planet wheel carrier 10 are indicated at 25. A further bevel gear 13 is arranged co-axial to the rotor shaft 12 and to the gear wheel 3 and, with the associated bevel pinion 14, represents a take-off from the rotor shaft to a so-called subsidiary propeller, whose shaft is indicated at 27. This gear wheel 13 is rigidly connected to a shaft 15, which is mounted by means of a bearing 16, for taking up both transverse and longitudinal forces, in the bearing cover 17 rigidly connected with the housing 1. The shaft 15 is guided through the hollow shaft 5 and is mounted in this by means of at least two bearings 18 and 19, of which the bearing 19 is preferably arranged directly inside the bearing 6. The shaft 15 is non-rotatably connected with the rotor shaft 12 by means of a preferably articulated intermediate shaft 20. For this purpose, the intermediate shaft 20 is connected with the rotor shaft 12 by way of a gear coupling 23 and with the shaft 5 by way of a gear coupling 24.

The above-described kind of support of the two gear wheel shafts 5 and 15 has the advantage that the two gear wheels 3 and 13 are guided substantially rigidly in relation to their axis, with an extremely slight weight. Particularly, the very rigid hollow shaft 5 is capable of ensuring this exact guiding in a far better manner than is possible for bearings to do in the naturally yieldable light metal housing 1.

The rigidity of the mutual support of the two shafts 5 and 15 can be still further improved by providing two bearings 21 and 22, in place of the bearing 18, as shown in Fig. 2.

It is further pointed out that the arrangement of the two gear wheels 3 and 13 can be such that the force couples acting on these gear wheels 3 and 13 are mutually opposed; their compensation effected by way of the bearings 18 and 19 or 19, 21 and 22 thus acts in the shortest way without the intermediary of light metal housing parts; for this reason, the invention ensures a correct guiding of the two gear wheels 3 and 13 with the smallest constructional and weight requirements.

What I claim is:

1. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means adjacent said second gear of said first pair of bevel gears for rotatably mounting said intermediate hollow shaft in said housing, a driven shaft coaxially arranged within said intermediate hollow shaft, spaced second and third bearing means for rotatably mounting said driven shaft within said intermediate hollow shaft, a planetary gear set mounted in said housing, a sun gear of said planetary gear set being secured to said intermediate hollow shaft, a reaction ring gear of said planetary gear set being fastened to said housing, and a planet carrier with planet gears engaging said sun gear and said ring gear being secured to said driven shaft, a first rotor shaft rotatably mounted in said housing and coaxially aligned with respect to and driven by said intermediate shaft through a one-way coupling, a second rotor shaft rotatably mounted in said housing so as to intersect with its axis the axes of said first rotor shaft, said intermediate shaft, and said driven shaft, a second pair of intermeshing bevel gears, the first gear of which is secured to said second rotor shaft and the second gear of which is secured to said driven shaft, and fourth bearing means adjacent said second bevel gear of the second pair of bevel gears for rotatably mounting said driven shaft within said housing.

2. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means rotatably supporting said intermediate hollow shaft in said housing, a first rotor shaft rotatably mounted in said housing and coaxially aligned with respect to and driven by said intermediate shaft, a driven shaft coaxially arranged within said intermediate hollow shaft, second and third bearing means arranged in spaced relationship within said intermediate hollow shaft rotatably supporting said driven shaft within and on said intermediate hollow shaft, torque transmitting means drivably connecting said first rotor shaft to said driven shaft, a second rotor shaft rotatably mounted in said housing so as to intersect with its axis the axes of said first rotor shaft, said intermediate shaft, and said driven shaft, a second pair of intermeshing bevel gears, the first gear of which is secured to said second rotor shaft and the second gear of which is secured to said driven shaft, and fourth bearing means rotatably supporting said driven shaft within said housing.

3. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means adjacent said second gear of said first pair of bevel gears rotatably supporting said intermediate hollow shaft in said housing, a first rotor shaft rotatably mounted in said housing and coaxially aligned with respect to and driven by said intermediate shaft, a driven shaft coaxially arranged within said intermediate hollow shaft, spaced second and third bearing means arranged within said intermediate hollow shaft rotatably carrying said driven shaft by said intermediate hollow shaft, coupling means drivably connecting said first rotor shaft to said driven shaft, a second rotor shaft rotatably mounted in said housing so as to intersect with its axis the axes of said first rotor shaft, said intermediate shaft, and said driven shaft, a second pair of intermeshing bevel gears, the first gear of which is secured to said second rotor shaft and the second gear of which is secured to said driven shaft, and fourth bearing means adjacent said second bevel gear of the second pair of bevel gears rotatably supporting said driven shaft within said housing.

4. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means adjacent said second gear of said first pair of bevel gears rotatably supporting said intermediate hollow shaft in said housing, a first rotor shaft rotatably mounted in said housing and coaxially aligned with respect to said intermediate shaft, a planetary gear set transmitting torque from said intermediate shaft to said first rotor shaft, a driven shaft coaxially arranged within said intermediate hollow shaft, spaced second and third, bearing means arranged within said intermediate hollow shaft rotatably supporting said driven shaft by said intermediate hollow shaft, coupling means drivably connecting said first rotor shaft to said driven shaft, a second rotor shaft rotatably mounted in said housing so as to intersect with its axis the axes of said first rotor shaft, said intermediate shaft and said driven shaft, a second pair of intermeshing bevel gears, the first gear of which is secured to said second rotor shaft and the second gear of which is secured to said driven shaft, and fourth bearing means adjacent said second bevel gear of the second pair of bevel gears rotatably supporting said driven shaft within said housing.

5. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means rotatably supporting said intermediate hollow shaft in said housing, a first rotor shaft rotatably mounted in said housing and coaxially aligned with respect to said intermediate shaft, a planetary gear set comprising a sun gear element, a ring gear element and a planet carrier element with at least one planet gear engaging said sun gear element and said ring gear element, a first of said elements being connected to said intermediate hollow shaft, a second of said elements being connected to said housing and the third of said elements being connected to said first rotor shaft, a driven shaft coaxially arranged within said intermediate hollow shaft, spaced second and third bearing means arranged within said intermediate hollow shaft rotatably supporting said driven shaft by said intermediate hollow shaft, coupling means for drivably connecting said first rotor shaft to said driven shaft, a second rotor shaft rotatably mounted in said housing so as to intersect with its axis the axes of said first rotor shaft, said intermediate shaft, and said driven shaft, a second pair of intermeshing bevel gears, the first gear of which is secured to said second motor shaft and the second gear of which is secured to said driven shaft, and fourth bearing means rotatably mounting said driven shaft within said housing, said gear means being arranged such that the force couples of said intermediate hollow shaft and said driven shaft are mutually opposed.

6. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means rotatably supporting said intermediate hollow shaft in said housing, a first rotor shaft rotatably mounted in said housing and coaxially aligned with respect to and driven by said intermediate shaft, a driven shaft coaxially arranged within said intermediate hollow shaft, spaced second, third and fourth bearing means arranged within said intermediate hollow shaft rotatably supporting said driven shaft by said intermediate hollow shaft, coupling means drivably connecting said first rotor shaft to said driven shaft, a second rotor shaft rotatably mounted in said housing so as to intersect with its axis the axes of said first rotor shaft, said intermediate shaft, and said driven shaft, a second pair of intermeshing bevel gears, the first gear of which is secured to said second rotor shaft and the second gear of which is secured to said driven shaft, and fifth bearing means rotatably supporting said driven shaft within said housing.

7. In a helicopter gearing, a housing, a driving shaft rotatably mounted in said housing, an intermediate hollow shaft rotatably mounted in said housing, the axes of said driving shaft and said intermediate hollow shaft intersecting one another, a first pair of intermeshing bevel gears, the first gear of which is secured to said driving shaft and the second gear of which is secured to said intermediate hollow shaft, first bearing means adjacent said second gear of said first pair of bevel gears rotatably mounting said intermediate hollow shaft in said housing, a driven shaft coaxially arranged within said intermediate hollow shaft, spaced second and third bearing means arranged within said intermediate hollow shaft rotatably supporting said driven shaft by said intermediate hollow shaft, a first rotor shaft rotatably mounted in said housing and coaxially aligned with respect to said intermediate shaft, a planetary gear set mounted in said housing, a sun gear of said planetary gear set being drivably connected to said intermediate hollow shaft, a reaction ring gear of said planetary gear set being connected to said housing, and a planet carrier with planet gears engaging said sun gear and said ring gear, said planet carrier being drivably connected to said first rotor shaft through a one-way coupling, coupling means drivably connecting said first rotor shaft to said driven shaft, a second rotor shaft rotatably mounted in said housing so as to intersect with its axis the axes of said first rotor shaft, said intermediate shaft, and said driven shaft, a second pair of intermeshing bevel gears, the first gear of which is secured to said second rotor shaft and the second gear of which is secured to said driven shaft, and fourth bearing means adjacent said second bevel gear of the second pair of bevel gears rotatably mounting said driven shaft within said housing.

References Cited in the file of this patent
UNITED STATES PATENTS

| | | |
|---|---|---|
| 1,273,950 | Teltzrow | July 30, 1918 |
| 2,487,952 | Sznycer | Nov. 15, 1949 |
| 2,552,864 | Piasecki | May 15, 1951 |